US008199193B2

(12) United States Patent
Kolek et al.

(10) Patent No.: US 8,199,193 B2
(45) Date of Patent: Jun. 12, 2012

(54) VIDEO CAMERA INSPECTION SYSTEM FOR ROLLER HEARTH HEAT TREATING FURNACES AND THE LIKE

(75) Inventors: Kirby S. Kolek, Massillon, OH (US); Russell A. Kolek, Massillon, OH (US)

(73) Assignee: Caskol, LLC, Massillon, OH (US)

( * ) Notice: Subject to any disclaimer, the term of this patent is extended or adjusted under 35 U.S.C. 154(b) by 821 days.

(21) Appl. No.: 12/290,407

(22) Filed: Oct. 30, 2008

(65) Prior Publication Data

US 2010/0110175 A1 May 6, 2010

(51) Int. Cl.
*H04N 9/47* (2006.01)
*H04N 7/18* (2006.01)

(52) U.S. Cl. .......................................... 348/83; 348/143

(58) Field of Classification Search .................... 348/83, 348/143

See application file for complete search history.

(56) References Cited

U.S. PATENT DOCUMENTS

| | | | | |
|---|---|---|---|---|
| 5,715,328 | A * | 2/1998 | Tsukihara | 382/141 |
| 5,777,668 | A * | 7/1998 | Amano | 348/83 |
| 6,229,563 | B1 * | 5/2001 | Miller et al. | 348/83 |
| 6,325,621 | B1 * | 12/2001 | Murasaki et al. | 432/250 |
| 6,806,900 | B2 * | 10/2004 | Eversole et al. | 348/83 |
| 7,641,402 | B2 * | 1/2010 | Kocanda et al. | 396/427 |
| 7,719,564 | B2 * | 5/2010 | Gao et al. | 348/83 |

* cited by examiner

*Primary Examiner* — Kristie Shingles
(74) *Attorney, Agent, or Firm* — Sand & Sebolt

(57) ABSTRACT

A heat treating furnace inspection system comprises a camera configured to move through the furnace chamber of the furnace. The system typically includes a carriage which carries the camera and is especially useful for inspecting a roller hearth furnace. Conveyor rolls or another conveyor mechanism of the furnace is operated to move the camera through the furnace chamber in order to photograph the interior of the chamber for the purposes of inspection. Images of the furnace chamber interior may be displayed on a display screen and merged with text which may communicate information related to inspection findings.

24 Claims, 5 Drawing Sheets

VIDEO CAMERA INSPECTION SYSTEM FOR ROLLER HEARTH HEAT TREATING FURNACES AND THE LIKE

BACKGROUND OF THE INVENTION

1. Technical Field

The present invention is related generally to roller hearth or other heat treating furnaces. More particularly, the present invention is related to an inspection system for such furnaces. Specifically, the present invention is related to the use of a camera for inspecting the interior of such furnaces.

2. Background Information

Roller hearth furnaces are well known in the art and typically include a heating section and a cooling section for heating and cooling various workloads as they move along a generally horizontal elongated path through the interior chamber of the furnace. By way of example, U.S. Pat. Nos. 2,175,233 granted to Vaughan, 2,634,083 granted to Baker, 3,806,312 and 3,947,242 granted to McMaster et al, 4,330,268 granted to Kremheller et al, 4,527,974 granted to Carraroli et al, and 4,932,864 granted to Myiabe, all disclose roller hearth furnaces, the contents of said patents being incorporated herein by reference.

Roller hearth furnaces may be used at relatively low heating ranges, for example, 200 to 400 or 500 degrees F., for the purpose of baking bread or any other workloads which would be heated to such a temperature range. Higher temperature roller hearth furnaces are also well known in the art for heating metals, glass, ceramic materials and the like. For example, such furnaces may be used for annealing steel or other metals. In the case of annealing steel, the steel objects are typically heated to slightly above hardening temperature, somewhere on the order of 1700 degrees F. (925 degrees C.) and cooled quickly to a temperature at which transformation should take place, which is typically on the order of about 1200 degrees F. (650 degrees C.), held at this temperature until transformation has taken place and then cooled. Copper brazing furnaces may also be used to produce copper brazed assemblies or parts or sintered parts formed from powdered metals. Such parts may be, for example, heated up to 2100 degrees F. (1150 degrees C.) depending upon the specific materials used in forming the workload. Another example is the heating of sheets of glass or metal. The previous listing is by way of example only since roller hearth furnaces can be used for heat treating any material desired. Roller hearth furnaces typically have a relatively small vertical clearance above the internal conveyor rolls which are externally driven to carry various types of workloads through the furnace for heating and cooling thereof. For this reason and others, the inspection of the interior of the furnace may be substantially impossible by direct observation without taking various portions of the furnace apart, such as opening up a given furnace section in order to inspect its interior.

There is a variety of other heat treating furnaces which are generally horizontally elongated for heating workloads as they move from an entry end to an exit end thereof. Each of these types of furnaces utilizes a conveyor system for conveying a workload to be heated therethrough. For instance, a pusher furnace utilizes a pusher assembly which may have one extendable-retractable pusher or two of such pushers which operate in an alternating fashion in order to push pusher plates with workloads thereon along one or more slide rails extending through the furnace chamber such that the pusher assembly is pushing a series of pusher plates which are sequentially in contact with one another along the length of the furnace chamber. Other conveyor systems may include one or more conveyor belts, chain conveyers, walking floors and so forth. While some of these furnaces may have an interior chamber of suitable dimensions to allow a person to move through the chamber to directly observe and inspect the chamber walls, heaters, cooling devices and so forth, there maybe other reasons why a person should not enter the furnace chamber.

It is generally preferred not to shut down or not to completely shut down such furnace systems, not only to minimize production down time and energy costs, but also to minimize the negative effects of thermal contraction and expansion when the furnace is cooled for inspection and then reheated for operational purposes. Thus, it would be preferable to inspect the furnace chamber without reducing the heated chamber any more than necessary. Even maintaining the furnace at relatively lower temperature ranges such as 150 to 200 degrees F. would typically make it prohibitive for an individual to personally enter the furnace chamber in order to perform an inspection. There is thus a need in the art for an inspection system for such furnaces which eliminates the need for an individual to enter the furnace chamber even if the physical dimensions are sufficient for that purpose, to eliminate the need for disassembling portions of the furnace in order to inspect the interior chamber, and to minimize the reduction of the temperature of the furnace in order to perform such an inspection.

BRIEF SUMMARY OF THE INVENTION

The present invention provides a method comprising the steps of: operating a conveyor mechanism of a heat treating furnace to move a camera downstream within a furnace chamber of the furnace from adjacent an entry end of the furnace chamber toward an exit end of the furnace chamber; and photographing with the camera a portion of the furnace bounding the furnace chamber to produce an image of the portion of the furnace.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
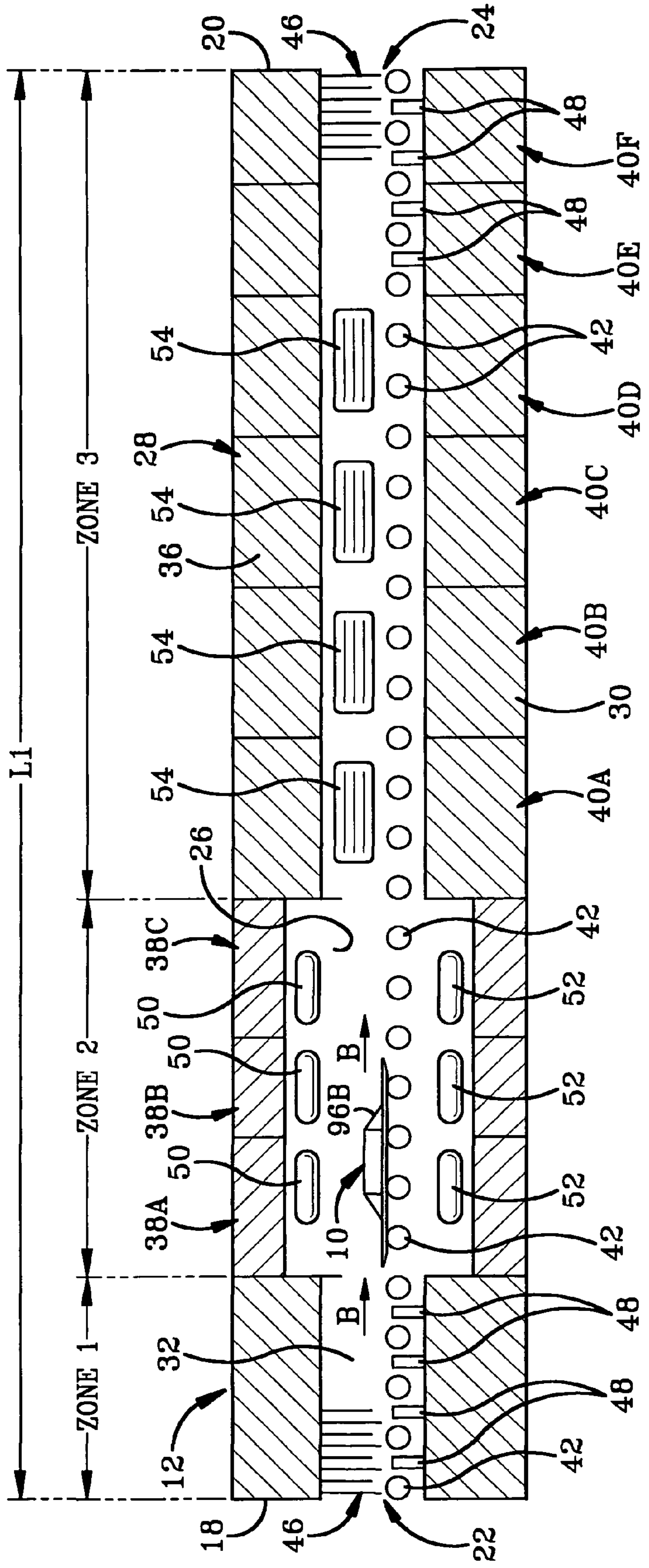
FIG. 1 is a diagrammatic longitudinal sectional view taken from the side of the furnace showing the carriage of the present invention moving through the interior chamber of the furnace.
Figure 2:
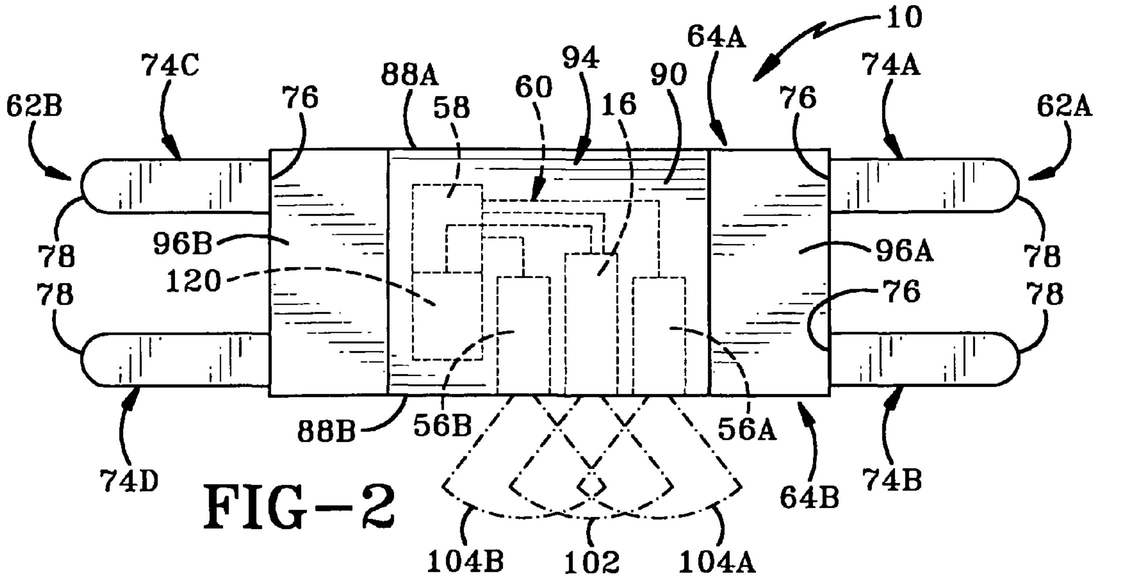
FIG. 2 is a top plan view of the carriage which diagrammatically indicates the operation of the onboard camera and onboard lights.

The inspection system of the present invention includes a carriage which is shown generally at 10 in FIG. 1 moving through a heat treating furnace 12. The inspection system typically also includes a display device such as a computer 14 (FIG. 7) used to display photographic images of the furnace chamber taken by a camera 16 (FIGS. 2-3) onboard carriage 10. In short, carriage 10 is configured to inspect the interior chamber of furnace 12. Furnace 12 is shown specifically as a roller hearth furnace but is also intended to represent any type of heat treating furnace through which a workload or work piece to be heated is moved along a generally horizontal path. As noted in the Background section of the present application, this includes any suitable conveying apparatus such as the pusher assembly of a pusher furnace, conveyor belts, chain conveyors, walking floors and so forth.

Furnace 12 has entry and exit ends 18 and 20 defining therebetween a longitudinal direction of the furnace and length L1 of the furnace which can be several hundred feet. Many of the roller furnaces have a length which ranges from about 100 to 350 feet or so. However, some of these furnaces may be shorter and generally tend to be at least 60, 70, 80 or 90 feet long. Furnace 12 includes left and right sides 25 and 27 defining therebetween an axial direction of the furnace. Furnace 12 has entry and exit vestibules 22 and 24 respectively adjacent entry and exit ends 18 and 20 of a generally horizontal interior furnace chamber 26 extending the full length of the furnace. Furnace 12 includes a thermally insulated chamber wall 28 which circumscribes and defines chamber 26 and extends from entry end 18 to exit end 20. Chamber wall 28 is often of a generally rectangular or square cross section although it may also be generally circular or other shapes. In the exemplary embodiment, chamber wall 28 is generally rectangular in cross section and includes a bottom wall 30, left and right side walls 32 and 34 (FIG. 6A) connected to and extending upwardly from bottom wall 30, and a top wall 36 connecting to and extending between the upper ends of side walls 32 and 34 over bottom wall 30. Each of the walls of chamber wall 28 may include bricks, metal framework, concrete or mortar and various other structures known in the art which are typically refractory materials.

FIG. 1 shows that furnace 12 includes a zone 1, a zone 2 and a zone 3. Zone 1 is essentially the same as entry vestibule 22, zone 2 is a heating zone and zone 3 is a cooling zone. FIG. 1 further shows heating zone 2 as having furnace sections 38A-C and cooling zone 3 having furnace sections 40A-F. Each of the sections 38 and 40 are typically removably connected to one another by any suitable means known in the art. For instance, each section may have outwardly projecting flanges which are connected to one another by nuts and bolts. Furnace section 40A is similarly connected to the furnace section or sections of zone 1. Each furnace section may also use access panels or doors which may be removed or opened to allow access to a portion of the furnace section. In FIG. 1, cooling zone 3 includes exit vestibule 24 which is generally the portion of furnace chamber 26 within section 40F or sections 40E and 40F. Furnace 12 may include many more furnace sections than shown in any of the zones but is shown here diagrammatically for the present purposes.

Figure 6A:
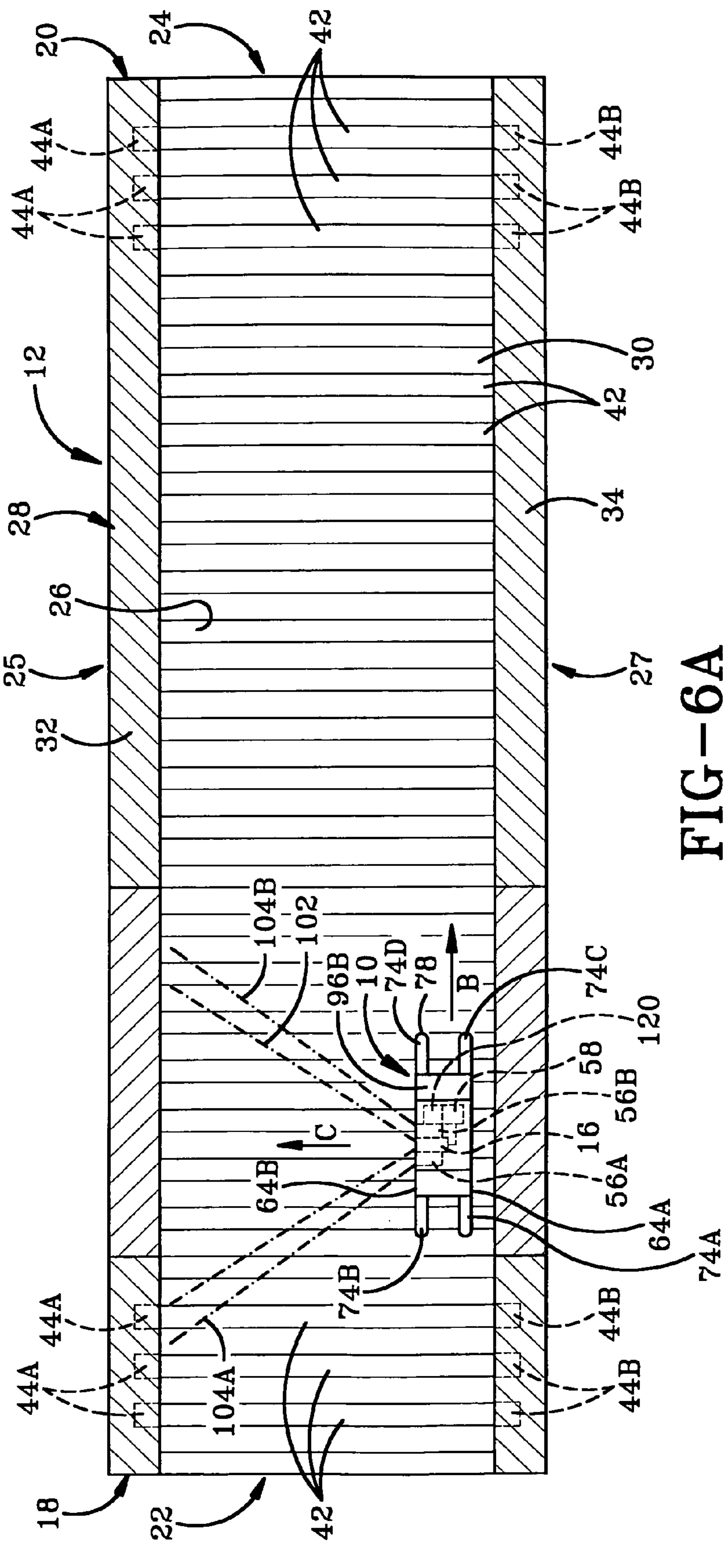
FIG. 6A is a diagrammatic sectional view of the furnace taken from above and showing the carriage moving through the furnace chamber along one side of the furnace.
Figure 6B:
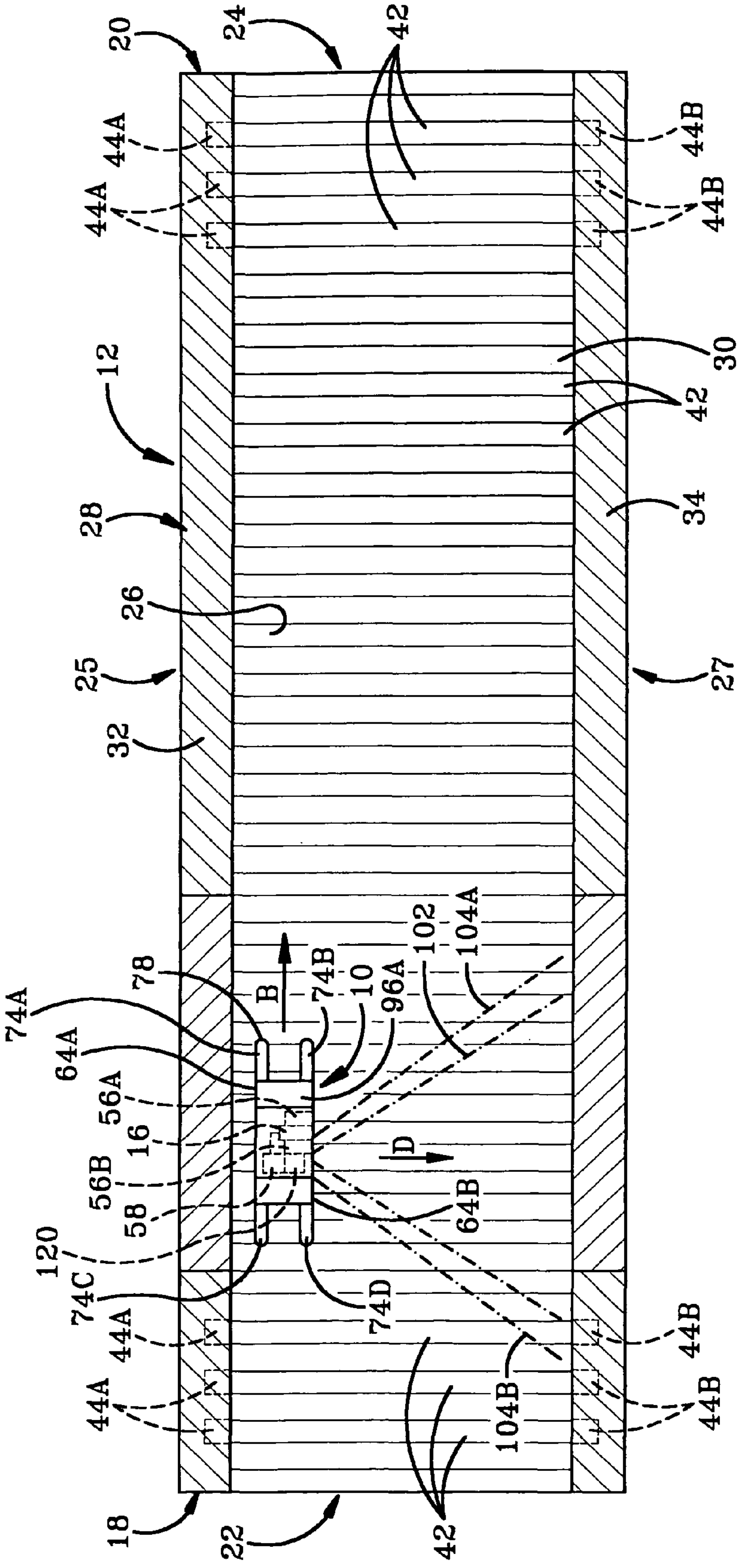
FIG. 6B is similar to FIG. 6A and shows the carriage moving along the opposite side of the furnace.

Furnace 12 includes a conveyor assembly which is operable to move workloads to be heated through chamber 26 from entry vestibule 22 to exit vestibule 24. In the exemplary embodiment, the conveyor assembly of furnace 12 includes multiple parallel conveyor rolls 42 which are substantially horizontal and axially elongated between side walls 32 and 34. Each adjacent pair of rolls 42 is longitudinally spaced from one another whereby rolls 42 are spaced along the full length of chamber 26 at about the same height. Each roll 42 is rotatably mounted about a substantially horizontal axially extending axis on respective left and right bearings 44A and 44B (only some of which are shown in FIG. 6B) mounted respectively on left and right side walls 32 and 34. As illustrated in FIG. 1, each zone includes a plurality of rolls 42, as does each of the furnace sections.

Adjacent entry end 18, several flexible refractory curtains 46 hang downwardly from the bottom of top wall 36 such that the lower ends of curtains 46 are closely adjacent or even abutting the top of one or more rolls 42 within vestibule 22. Each curtain 46 typically includes multiple vertically elongated strips which are axially aligned from left to right between side walls 32 and 34 extending substantially all the way across chamber 26. Curtains 46 minimize the heat transfer between chamber 26 and atmosphere external to chamber 26 adjacent entry end 18. More particularly, curtains 46 minimize heat exchange between the portion of passage or chamber 26 above rolls 42 and the ambient external atmosphere. A plurality of barrier walls 48 are connected to and extend upwardly from the top of bottom wall 30 within entry vestibule 22 in order to similarly block or minimize heat transfer and gas flow below and around rolls 42 within vestibule 22 between the associated portions of chamber 26 and external atmosphere. More particularly, each barrier wall 48 extends upwardly between an adjacent pair of rolls 42 within vestibule 22 and extends all the way from left sidewall 32 to right sidewall 34. Each barrier wall 48 extends upwardly so that its upper portion is disposed directly between a pair of adjacent rolls 42 and so that the top of each barrier wall 48 is at a lower height than the top of the respective rolls 42 so that each wall 48 does not interfere with the flow of the workload moving through chamber 26 atop rolls 42.

Heating zone 2 includes a plurality of heating devices shown here as including a plurality of upper heat tubes 50 disposed adjacent and below top wall 36 and a plurality of lower heat tubes 52 disposed adjacent and above bottom wall 30. Tubes 50 and 52 are thus positioned respectively above and below rolls 42 within heating zone 2. In one typical embodiment, fuel is burned to produce hot exhaust gasses which move through heat tubes 50 and 52 to provide the heat within zone 2 without the exhaust gasses directly contacting the atmosphere within chamber 26 and thus without coming into contact with work pieces moving through the chamber. Electrical resistance heaters are also well known in the art for providing heat within heating zone 2. Depending upon the specific application, induction heating or other heating methods may also be used. Furnace chamber 26 may be filled with air or an inert gas according to the given circumstances.

Cooling zone 3 is now described in greater detail. As previously noted, cooling zone 3 includes furnace sections 40A-F. In addition, cooling zone 3 includes several cooling devices 54 which are mounted on chamber wall 28 along its inner surface so that each cooling device 54 bounds interior chamber 26 in order to facilitate the transfer of heat from within chamber 26 to a location external to furnace 12. Cooling devices 54 are thus used to accelerate the rate of cooling in a controlled manner of work pieces or other objects moving through interior chamber 26 during operation. One typical cooling device is the well known water jacket through which cooled water is pumped in order to absorb heat from within chamber 26 within cooling zone 3 so that the heated water is pumped to a location external to furnace 12 and cooled typically by a blower which blows air across the pipes within which the water is moving and/or fins connected thereto. However, any other known cooling device known in the art may be used for this purpose. FIG. 1 shows cooling devices mounted on left wall 32, and there are similar cooling devices 54 mounted on right wall 34. Cooling devices may also be mounted on bottom wall 30 and/or top wall 36. Cooling zone 3 includes exit vestibule 24, which is more or less a mirror image of entry vestibule 22. Thus, exit vestibule 24 includes several conveyor rolls 42 with barrier walls 48 positioned therebetween, and a set of exit curtains 46 having same configuration as those adjacent entry end 18. Barrier walls 48 and curtains 46 adjacent exit end 20 serve the same purpose as those adjacent entry end 18.

Referring now to FIGS. 2-5, carriage 10 is described in greater detail. In addition to carrying camera 16, carriage 10 also carries a pair of lights 56A and 56B as well as a battery 58 which is in electrical communication with camera 16 and lights 56 via respective electrically conductive wires 60 to electrically power the operation of camera 16 and light 56. Carriage 10 has opposed ends 62A and 62B defining therebetween a longitudinal direction of the carriage, opposed sides 64A and 64B defining therebetween an axial direction of the carriage, a top 66 and a bottom 68. In the exemplary embodiment, carriage 10 is configured so that either of ends 62A and 62B may be the front leading end or the rear trailing end as carriage 10 travels through a heat treating furnace. Carriage 10 includes a bottom wall 70 which in the exemplary embodiment is substantially rectangular and has opposed ends 72A and 72B. Bottom wall 70 extends substantially from side 64A to side 64B. Four runners or skis 74A-D are rigidly secured to and extend outwardly from bottom wall 70 so that one pair of the skis 74A and 74B extend outwardly parallel to one another from end 72A of wall 70 and another pair of these skis 74C and 74D extend parallel and in the opposite direction from skis 74A and 74B outwardly from end 72B of wall 70. All of skis 74 are substantially identical and extend in the longitudinal direction parallel to one another. Skis 74A and 74B are axially spaced from one another, as are skis 74A and 74D, while the latter pair is longitudinally spaced from the former pair by the length of bottom wall 70. More particularly, each ski 74 has an inner end 76 connected to the respective end 72A or 72B and extends outwardly therefrom to an outer terminal end 78 which may serve as a leading or trailing edge or end of carriage 10 during operation depending on which direction the carriage is traveling.

A thermally insulated enclosure 80 is mounted on bottom wall 82 and encloses camera 16, lights 56, battery 58 and electrically conductive wires 60. More particularly, enclosure 80 includes a bottom wall 82 seated on bottom wall 70 and a perimeter wall 84 which includes opposed end walls 86A and 86B and opposed side walls 88A and 88B. Enclosure 80 also includes a top wall 90 secured to the top of perimeter wall 84 whereby bottom wall 82, perimeter wall 84 and top wall 90 define therewithin an interior chamber 92 which contains the camera, lights, battery and wires. In the exemplary embodiment, the various walls of enclosure 80 include layers of thermal insulation configured to protect the various components within interior chamber 92 from overheating when carriage 10 is used inside a heated furnace such as furnace 12. Onboard cooling devices may also be used in order to protect said components within a heated environment. Top wall 90 may be removably connected to perimeter wall 84 in order to serve as an access door which may be removed in order to access interior chamber 92 and thus camera 16, lights 56, battery 58 and wires 60. This allows for repair and replacement of various parts as necessary. It also allows for access to camera 16 in order to remove the camera from interior chamber 92 or to remove the recording media 120 on which images or data related to images photographed by the camera are stored. While top wall 90 may in its entirety be removable to provide such access, another openable or removable door may also be provided to allow access to interior chamber 92.

Top wall 90 also serves as part of a cover 94 which further includes longitudinally spaced tapered walls 96A and 96B which are respectively connected to the opposed ends of top wall 90 and taper downwardly and away therefrom. Depending on the orientation of carriage 10, either of tapered walls 96 may serve as a leading or trailing tapered wall of cover 94. Each tapered wall 96 includes an inner edge 98 secured to the respective edge of top wall 90 with tapered walls 96 extending outwardly therefrom to a terminal outer edge 100. In the case where outer edge 100 serves as the leading edge of cover 94, tapered wall 96 may thus be described as tapering upwardly and rearwardly (or upwardly and upstream) from edge 100 to edge 98 and the front of top wall 90. Tapered wall 96 and its top surface angle upwardly relative to horizontal (represented by top surface 112 of ski 74) at an angle A1 which is most typically within the range of about 10, 20 or 30 degrees to about 60 degrees. This rearward and upward taper also applies to the upper or top surface of the tapered wall 96 which serves as the leading tapered wall. Tapered walls 96A and 96B are substantially mirror images of one another.

Figure 3:
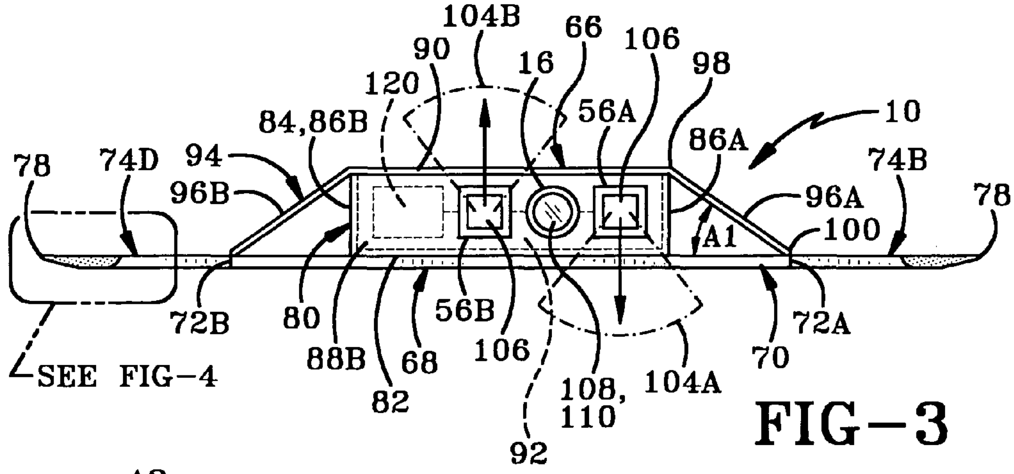
FIG. 3 is a side elevational view of the carriage illustrating the respective upward and downward angling of the onboard lights.

Carriage 10 may carry more than one camera, more than one battery and additional lights as well. However, in the exemplary embodiment a single camera 16 is mounted and aimed to one side in order to photograph objects within interior chamber 26 of furnace 12 which may come in to the camera's field of view 102 represented in dot dashed lines in FIG. 2. Likewise, lights 56A and 56B are directed to the same side of carriage 10 as camera 16, as illustrated by the areas of illumination 104A and 104B of the respective lights 56A and 56B. In the exemplary embodiment, lights 56A and 56B are disposed on opposed sides of camera 16 and produce areas of illumination which overlap one another. However, as shown in FIG. 3, lights 56A and 56B are respectively aimed or directed to angle downwardly and upwardly whereby the areas of illumination 104A and 104B are respectively directed generally downwardly and upwardly, as indicated by the corresponding arrow in FIG. 3. There is a pair of windows 106 on side wall 88B which typically includes an opening formed therethrough with a plate of glass or other transparent material serving as a clear lens. A camera window 108 is also formed in side wall 88B between windows 106 to allow camera 16 to view objects external to enclosure 80. Window 108 similarly includes an opening typically covered by a plate of glass or the like with the camera lens 110 disposed inwardly of and adjacent said plate of glass or the like. Camera lens 110 is preferably a wide angle lens which provides a relatively wide field of view 102 which is helpful within the relatively tight confines of many roller hearth furnaces or other heat treating furnaces.

Figure 4:
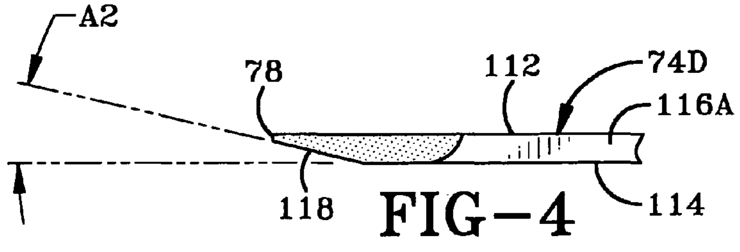
FIG. 4 is an enlarged side elevational view of the encircled portion of FIG. 3 showing the outer end of one of the carriage skis.
Figure 5:
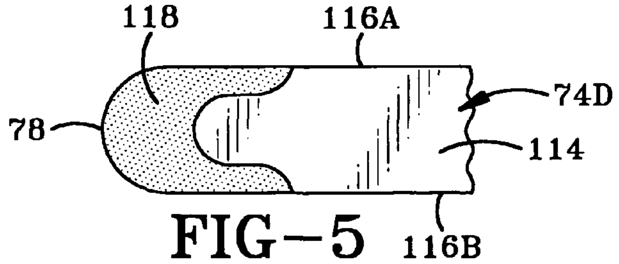
FIG. 5 is a bottom plan view of the outer end of the ski shown in FIG. 4.

Ski 74 is described in greater detail with reference to FIGS. 4 and 5. Each ski 74 in the exemplary embodiment is generally rectangular, flat and horizontal. Each ski 74 has top and bottom surfaces 112 and 114 which are substantially flat and horizontal with a pair of opposed edges or sides 116A and 116B which are parallel and longitudinal. Each ski 74 includes an end portion adjacent terminal outer end 78 which is tapered to facilitate movement of carriage 10 through furnace 12. For purposes of description, terminal end 78 is referred to as a front or leading end. Thus, front end 78 is convexly curved as viewed from above and in the exemplary embodiment is generally semicircular from edge 116A to 116B. Thus, the front portion of each ski 74 as viewed from above curves from its center point at front edge 78 rearwardly (or upstream) and laterally away from inner edge 116B and the opposed side of carriage 10 to outer edge 116A or the corresponding side 64 of carriage 10. The front or leading portion of each ski 74 as viewed from above also tapers from its center point in the opposite direction rearwardly (or upstream) and laterally. The front end portion of each ski 74 includes a tapered bottom surface 118 which tapers rearwardly (or upstream) and downwardly from terminal end 78 to the front of horizontal bottom surface 114. Tapered bottom surface 118 and a horizontal plane define therebetween an angle A2 which is typically within the range of about 5 or 10 degrees to about 25 or 30 degrees and more typically within the range of about 10 to 15 or 20 degrees. The front portion of ski 74 may also taper upwardly toward the sides or edges 116 so that the tapered bottom surface may be generally U-shaped as shown in FIG. 5. Bottom surface 118 typically also serves as a rough traction surface which is substantially rougher than bottom surface 114. In the exemplary embodiment, surface 118 is formed of aluminum oxide ($Al_2O_3$) or another abrasive material.

The operation of the inspection system of the present invention is now described with reference to FIGS. 6A, 6B and 7. FIG. 6A shows carriage 10 in an early stage of traveling through interior chamber 26 of furnace 12 from entry end 18 to exit end 20. Typically, furnace 12 or the related assembly thereof includes rolls similar to rolls 42 in front of or upstream of entry vestibule 22 as well as similar rolls or a support platform or conveyor mechanism downstream of exit vestibule 24. Thus, carriage 10 is placed (typically manually) on such a platform or conveyor mechanism which may be conveyor rolls and moved onto rolls 42 within entry vestibule 22. Alternately, carriage 10 may be simply placed on the most upstream rolls 42 of furnace 12 within entry vestibule 22. Rolls 42 are rotated, typically by a chain drive mechanism wherein a chain engages sprockets along one or both ends of the various rolls so that the multiple rotating rolls 42 drive forward motion of carriage 10 sitting thereon in the downstream direction as indicated at arrows B in FIGS. 1 and 6A. As carriage 10 enters vestibule 22, its top surface slidably engages the lower ends of curtains 46, causing them to move upward and in the downstream direction to some degree until they fall back into position after carriage 10 passes beyond curtains 46. Tapered wall 96B and its tapered top surface facilitates the upward sliding of the lower portions of curtains 46 along said top surface as carriage 10 moves downstream and is configured to prevent curtains 46 from catching on carriage 10 as it moves therethrough.

Although conveyor rolls 42 are intended to be positioned at the same height throughout the furnace, they may be vertically offset from one another to some degree, whether this occurs during initial construction of the furnace or from the effects of settling or damage to the furnace. The tapered configuration of tapered bottom surface 118 facilitates the movement of the front end of 62A of carriage 10 upwardly from a conveyor roll 42 which is somewhat lower than the adjacent conveyor roll downstream thereof, thus helping to prevent an interruption of the movement of carriage 10 in a downstream direction. In addition, the portion of terminal end 78 which tapers rearwardly and away from the opposite side may facilitate the movement of carriage 10 around a snag or the like which is disposed along the adjacent sidewall 34 bounding chamber 26. As shown in FIG. 6A, carriage 10 is positioned generally on the right side of furnace chamber 26 so that side 64A of carriage 10 is adjacent and sometimes may be in contact with sidewall 34 as it moves downstream through chamber 26.

In this orientation, camera 16 and lights 56, as powered by battery 58, are operated to respectively photograph and illuminate the various structures of furnace 12 which bound or are within chamber 26 to the left of carriage 10, as illustrated by arrow C and the dot dashed lines shown in FIG. 6. Camera 16 is typically a video camera and thus produces a streaming video or motion picture in a continuous fashion as it moves downstream through chamber 26. With carriage 10 moving along the right side of chamber 26 as shown, lights 56 illuminate the majority as (measured in the axial direction) or at least the left half of the structures bounding or within chamber 26 with which carriage 10 is generally aligned longitudinally as it moves downstream. Camera 16 is thus able to photograph said majority of the various structures, including conveyor rolls 42, curtains 46, barrier walls 48, bottom wall 40, top wall 36, left sidewall 32, upper and lower heating devices 50 and 52, the cooling devices 54 along left sidewall 32 and any other structures generally to the left of the center of interior chamber 26 as camera 16 moves within the vicinity of said structures. While various types of lights may be used, lights 56 are typically light emitting diodes (LEDs) or another type of light which is sufficiently bright while requiring a relatively minimal amount of the electric power from battery 58.

Although carriage 10 may move through furnace 12 when it is at an ambient temperature, it is typically preferred to perform the inspection when the furnace is still heated as much as possible as discussed in the Background section of the present application. Thus, carriage 10 may move through chamber 26 and camera 16 may be operated when furnace chamber 26 is for example at a temperature within a range of 200 to 250 degrees F. Depending on the specific configuration of carriage 10, the inspection may be carried out at higher temperatures such as 300, 400, 500, 600, 700, 800 degrees F. or even higher. Suitable insulation and/or onboard cooling devices are generally needed to operate in these higher temperatures although the ability to operate at higher temperatures also relates to the length of the furnace to be inspected, particularly the length of the heating zone, and the speed with which the conveyor mechanism can carry carriage 10 through furnace chamber 26.

By way of example, one roller hearth furnace with which carriage 10 has been tested has a total length of about 116 feet with the entry vestibule being about 4 feet long, the heating zone being about 32 feet long and the cooling zone being about 80 feet long, and wherein the maximum rate which the conveyor rolls could move carriage 10 was about 63 inches per minute, which is only slightly faster than one inch per second. At this rate, it would take about 22 minutes for carriage 10 to go through the 116 foot furnace and a little over 6 minutes to pass through the 32 foot heating zone. Obviously the length of these various zones and the rate with which carriage 10 may travel can vary substantially although the rate of travel is usually relatively slow. Carriage 10 must thus be configured so that battery 58 is capable of powering lights 56 and camera 16 throughout the journey of carriage 10 from entry end 18 to exit end 20 in order to provide a full inspection of at least one side of furnace chamber 26. As carriage 10 reaches the end of its first journey through chamber 26, it will pass through exit vestibule 24, deflecting curtains 46 upwardly in a downstream direction as previously discussed with regards to curtains 46 within entry of vestibule 22.

Carriage 10 is then removed from the exit end of furnace 12 and subsequently reinserted into entry vestibule 22 in a reverse orientation (FIG. 6B) adjacent left sidewall 32. More particularly, the terminal ends 78 of skis 74A and 74B now face forward or downstream instead of rearward or upstream as was the case with the first trip of carriage 10 through furnace chamber 26. In addition, side 64A is positioned facing and adjacent the inner surface of left sidewall 32, and tapered wall 96A becomes the leading tapered wall for deflecting curtains 46 upwardly and downstream as carriage 10 passes through the entry vestibule as well as when passing through the exit vestibule. In this orientation, camera 16 and lights 56 are aimed in the opposite direction (arrow D) in order to illuminate right sidewall 34 and the various other structures to the right of carriage 10, which is preferably at least the right half of chamber 26 as measured axially. During this second pass of carriage 10 through chamber 26, side 64B faces right sidewall 34, as do windows 106 and 108, opposite the direction they faced during the first trip shown in FIG. 6A. The second trip of carriage 10 through furnace chamber 26 thus provides a streaming video or a motion picture of the right portion or most of the right portion of furnace chamber 26 such that the images produced during the second trip overlap the images produced from the first trip in order to provide a substantially complete inspection of furnace chamber 26 once carriage 10 has completed its second trip and thus photographed the right portion of chamber 26 along its entire length.

Once the camera 16 is finished photographing the inside of furnace 12, enclosure 80 may be opened in order to retrieve the recording medium 120 (FIG. 7) on which the photographic images were stored. Although the recording medium 120 may be an electromagnetic recording medium such as video cassette tape, it is more typically any standard digital recording medium known in the art which can be downloaded to computer 14 in order to display the image or images 122 representing the structures bounding or within furnace chamber 26. These images are typically displayed on a display screen 124 of computer 14 or any other suitable mechanism for displaying the photographic images, whether still photographic images or a streaming video or motion picture, the latter being generally preferred.

Figure 7:
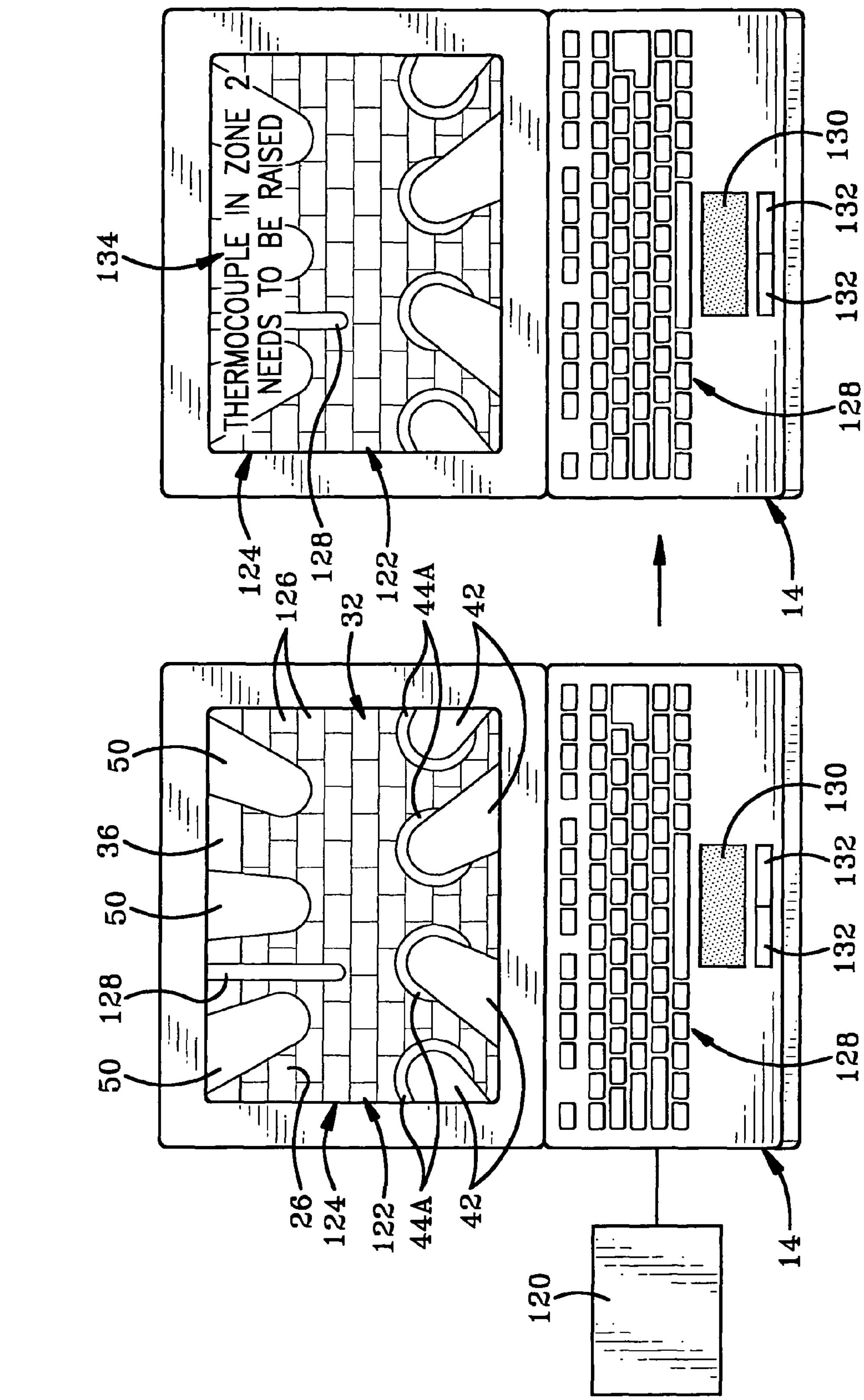
FIG. 7 is a diagrammatic operational view illustrating the downloading of data to a computer to produce photographic images on the display screen of the computer, including textual information concerning the inspection findings.

With the reference to FIG. 7, the inspector then reviews the photographic images which are preferably in the form of a motion picture in order to perform the inspection of the interior chamber of furnace 12 to ascertain or make an assessment of the condition of various portions or sections of furnace 12 and to see if any damage is evident whereby repairs may need to be made. The display screen on the computer on the left in FIG. 7 illustrates a typical view captured by camera 16 during its movement through interior chamber 26. While various other structures may be seen in the photographic images typically displayed on screen 124, the view illustrated in FIG. 7 shows portions of conveyor rolls 42 and associated bearings 44, portions of left wall 32 including its bricks 126 and the mortar therebetween, and portions of heating tubes 50 and top wall 36. In addition, the specific image shows a thermocouple 128 which has been dislodged from its proper position and is hanging down further than it should within interior chamber 26. Computer 14 has a standard alphanumeric keyboard 128, a touch sensitive mouse or pad 130 and standard left and right click buttons 132.

The inspection system further includes a text-merging computer program which is run on computer 14 and allows the user to merge text onto the photographic images. Thus, the inspector using the above-noted computer controls, can type in the desired text and incorporate it into the motion picture so that the text makes it clear, for instance, that a problem exists or that damage has been done to furnace 12 which needs to be corrected. The added or merged text 134 is shown on the display screen of the computer at the right in FIG. 7 as entered by the inspector. In the specific example, the text is "thermocouple in Zone 2 needs to be raised". Thus, text 134 not only indicates the problem but also the solution. Text 134 can also indicate the specific location within furnace 12 at which the condition exists. The text added may indicate anything desired by the inspector although most typically the inspector will add text indicating a specific condition of a portion of furnace 12, its location and what may need to be done in order to fix a given problem. Other typical examples of text which an inspector may add to the video include "bearing on right side of roller number 3 is worn out and needs to be replaced"; "brick wall needs to be rebuilt" (for instance referring to one of barrier walls 48 or any of the walls of chamber wall 28); "remove brick from rubbing against roll"; "roll number 18 is badly twisted and needs to be replaced"; "water has been leaking in the area from cooling zone roll number 16 to number 23" (thus indicating that the problem exists within the cooling zone and identifying the specific area by the use of the specified conveyor rolls within that zone); and "remove wooden box from under cooling lid number 13". The latter example illustrates a scenario wherein a wooden box or other item was either inadvertently left on the floor or bottom wall 30 of the furnace or, for example, may have somehow been inadvertently knocked off a carriage as it passed through the furnace during a heat treating process. This latter textual message also specifies the location by referring to the cooling lid with a specific number. It will be evident that various other types of messages may be merged onto the photographic images depending on the specific circumstances.

Typically, once the inspector has reviewed the video and added the text thereto, the video will be provided to the owner of the furnace or someone who is responsible for its maintenance and repairs for their review whereby they can relatively quickly appreciate the inspection findings and make a plan as to making repairs as needed. The ability to pinpoint the location of the repairs that need to be made allows maintenance personnel to remove portions of the furnace or disconnect various sections from one another in order to access those areas and perform the maintenance or repair.

In addition to adding text to the video which is indicative of the condition, status or serviceability of the furnace, the text may also include basic structural information about the furnace or other information. For instance, text may be added to identify the specific furnace and specify various dimensions of the furnace or its components and so forth. By way of example and with respect to the previously described 116 foot long furnace, the following text was added near the beginning of the corresponding video:

Furnace No. 2
Rolls are 69" wide [or long as measured from end to end]
First vestibule has 3 rolls and is 4 feet long
Heating zone has 31 rolls and is 32 feet long
Cooling zone has 79 rolls and is 80 feet long
Top speed is 63 inches per minute In addition or as an alternative to the addition of text to the video, a voice recording may be added to indicative of the type of information which may be added to the video by text as discussed above. The computer program may thus be configured to allow for the addition of a voice or other recording to accompany the video utilizing an onboard or a separate microphone in communication with the computer. While the addition of text or a voice recording to the video is generally desirable to facilitate the use of the inspection video or film ultimately available to the furnace owner, supervisor or maintenance personnel, this may be omitted. If so, maintenance personnel or others may review the video themselves to make a determination as to the condition of the furnace and whether repairs need to be made. The inspector reviewing the video may alternately or in addition also produce a separate report indicating the condition of the furnace, repairs which may need to be made, the location of problems identified and so forth. In any case, a communication is prepared which is either added to or merged with the video or separately provided such as via a printed or electronic report or document in order to provide the inspection findings to interested personnel. Such a report is represented by the image and text on the display screen 124 on the computer on the right of FIG. 7.

Although the inspection process of the present invention is described using a single carriage 10 having one camera 16 so that the carriage is passed through the furnace chamber first along one side and then along another in order to produce a streaming video of both sides of the interior of the furnace, the present system also includes other options. For instance, two or more cameras may be mounted on the carriage such that each camera is directed in a different direction so that the carriage may pass only once through a given interior chamber of the furnace, thereby minimizing the amount of time taken for the actual filming or photographing process. Thus, a given camera may be directed or aimed to the side, upwardly, downwardly, forward or rearward if desired. In certain circumstances, the specific orientation of the camera may provide advantages to inspect portions of the furnace not as easily viewed from a side viewing camera.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:

inserting a camera into a furnace chamber of a heat treating furnace through an entry end of the furnace chamber;

moving the inserted camera, with a conveyor mechanism, downstream through the furnace chamber from the entry end to an exit end of the furnace chamber so that the inserted camera is within the furnace chamber throughout downstream travel of the inserted camera from the entry end to the exit end;

photographing with the inserted camera a portion of the furnace bounding the furnace chamber to produce an image of the portion of the furnace; and removing the inserted camera from the exit end of the furnace.

2. The method of claim 1 wherein the step of moving comprises the step of moving the camera and a carriage carrying the camera past a downwardly hanging flexible refractory curtain within the furnace chamber so that the carriage slidably engages the curtain and causes a lower end of the curtain to move upwardly and downstream until the lower end falls back into position after the carriage passes beyond the curtain.

3. The method of claim 1 wherein the step of moving comprises the step of moving the camera through a heating zone and a cooling zone of the furnace.

4. The method of claim 1 wherein the step of moving comprises the step of moving the camera within the furnace chamber when the furnace chamber is at a temperature of at least 200 degrees F.

5. The method of claim 1 wherein the step of moving comprises the step of moving a carriage comprising a thermally insulated enclosure which encloses the camera.

6. The method of claim 1 wherein the step of moving comprises the step of moving a carriage carrying the camera along a generally horizontal path from the entry end to the exit end; wherein the carriage has a downstream end and a tapered bottom surface which tapers downwardly and upstream from the downstream end so that the tapered bottom surface facilitates the upward movement of the downstream end of the carriage during downstream movement of the carriage along the generally horizontal path, thus helping to prevent an interruption of the downstream movement of the carriage.

7. The method of claim 1 wherein the step of moving comprises the step of moving a carriage carrying the camera wherein the carriage has first and second opposed sides and a downstream end; and the first side has a tapered portion which tapers from the downstream end away from the second side and upstream throughout travel of the inserted camera and carriage from the entry end to the exit end so that the tapered portion is configured to facilitate the movement of the carriage around a snag disposed along a sidewall bounding the furnace chamber when the first side of the carriage is adjacent or in contact with the sidewall as the carriage moves downstream through the furnace chamber.

8. The method of claim 1 wherein the step of moving comprises the step of moving a carriage carrying the camera wherein the carriage has a downstream end and a bottom surface which comprises a rough traction portion which is adjacent the downstream end and positioned to contact rotating parallel conveyor rolls which are substantially horizontal and spaced from one another within the furnace chamber.

9. The method of claim 8 wherein the traction portion comprises aluminum oxide.

10. The method of claim 2 wherein the carriage has upstream and downstream ends and comprises a cover having a top wall extending over the camera and a tapered wall which is downstream of the top wall and tapers upwardly and upstream toward the top wall so that the tapered wall facilitates upward sliding of the lower end of the curtain and is configured to prevent the curtain from catching on the carriage during the step of moving the camera and carriage past the curtain.

11. The method of claim 1 wherein the step of moving comprises the step of moving a carriage carrying the camera wherein the carriage comprises a base and a pair of skis which extend downstream from the base throughout travel of the inserted camera and carriage from the entry end to the exit end.

12. The method of claim 1 wherein the step of moving comprises the step of moving a carriage carrying the camera and a cooling device.

13. The method of claim 1 wherein the furnace is a roller hearth furnace comprising multiple parallel conveyor rolls which are substantially horizontal, disposed in the furnace chamber, spaced along the furnace chamber from adjacent the entry end to adjacent the exit end and configured to carry workloads atop the rolls through the furnace; and further comprising the step of placing a carriage carrying the camera on the conveyor rolls; and wherein the step of moving comprises the step of rotating the rolls to move the carriage within the furnace chamber from adjacent the entry end to adjacent the exit end.

14. The method of claim 1 further comprising the step of creating a display which comprises the image and text which communicates information indicating a condition of the portion of the furnace.

15. The method of claim 14 wherein the step of creating comprises the step of creating the display on a video screen.

16. The method of claim 14 wherein the text communicates a location of the portion of the furnace.

17. The method of claim 14 wherein the text communicates information related to repair of the portion of the furnace.

18. The method of claim 1 further comprising the steps of viewing the image to make an assessment of a condition of the portion of the furnace; and communicating the assessment to a person responsible for maintenance of the furnace.

19. The method of claim 1 further comprising the steps of inspecting the image; and producing a report of inspection findings based on the step of inspecting.

20. The method of claim 1 further comprising the step of repairing the furnace based on information provided by the image.

21. The method of claim 1 wherein the step of photographing with the inserted camera comprises photographing with the inserted camera a first portion of the furnace bounding the furnace chamber to produce a first image of the first portion of the furnace; and further comprising, after the step of removing, the steps of:

reinserting the camera into the furnace chamber through the entry end;

moving the reinserted camera downstream through the furnace chamber from the entry end to the exit end so that the reinserted camera is within the furnace chamber throughout downstream travel of the reinserted camera from the entry end to the exit end;

photographing with the reinserted camera a second different portion of the furnace bounding the furnace chamber to produce a second image of the second portion of the furnace; and removing the reinserted camera from the exit end of the furnace.

22. The method of claim 21 wherein the first and second images overlap one another.

23. The method of claim 21 wherein the step of moving the inserted camera comprises moving a carriage carrying the inserted camera downstream in a first orientation through the furnace chamber from the entry end to the exit end; and the step of moving the reinserted camera comprises moving the carriage downstream in a second orientation through the furnace chamber from the entry end to the exit end, the second orientation being reverse of the first orientation.

24. The method of claim 21 wherein the step of moving the inserted camera comprises moving the inserted camera along a first side of the furnace with the camera aimed toward a second opposite side of the furnace throughout travel of the inserted camera from the entry end to the exit end; and wherein the step of moving the reinserted camera comprises moving the reinserted camera along the second side of the furnace with the camera aimed toward the first side of the furnace throughout travel of the reinserted camera from the entry end to the exit end.

* * * * *